Aug. 31, 1943.  U. C. RIGOULOT  2,328,360
GLARE SHIELD MOUNTING
Filed June 25, 1942
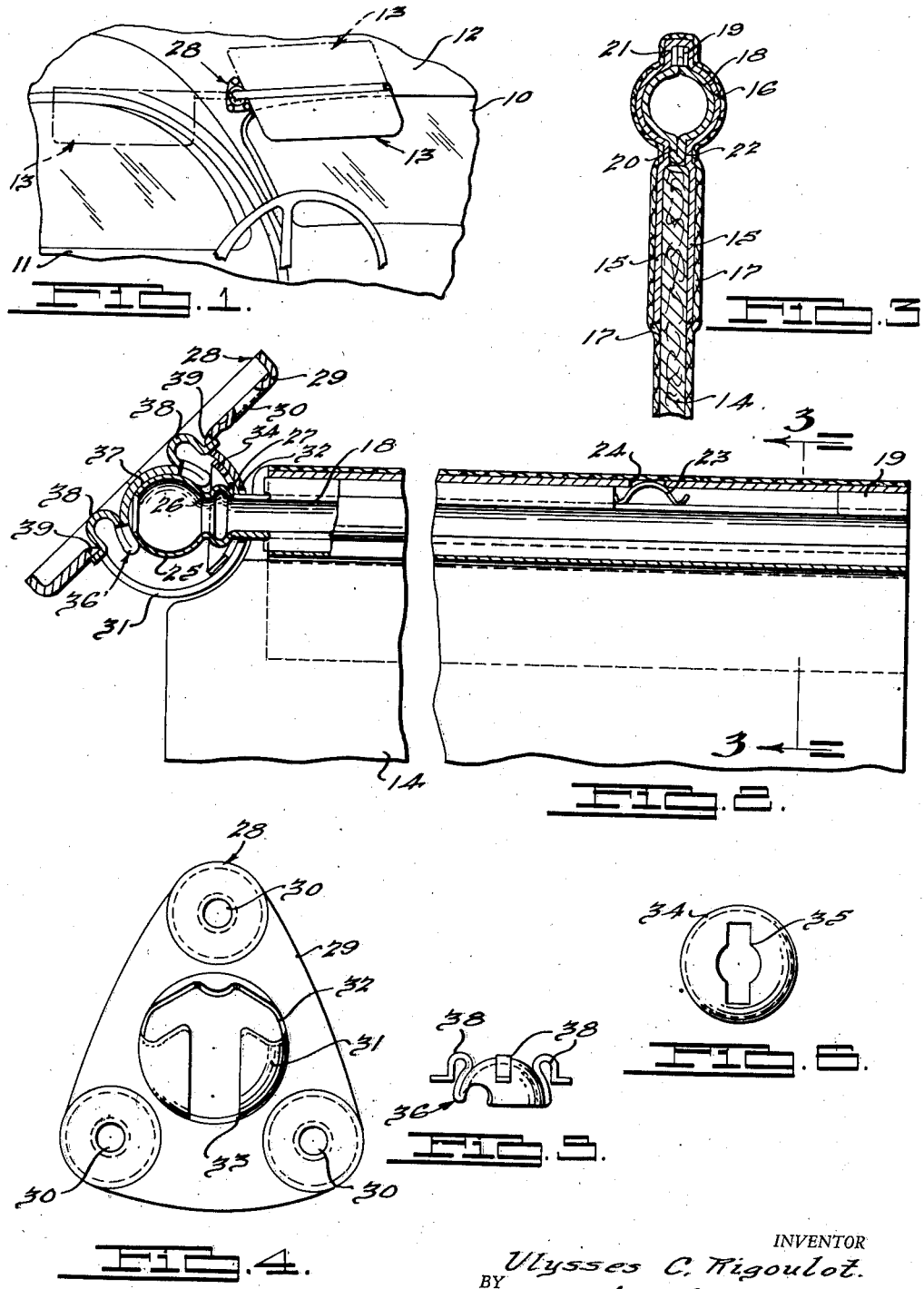
INVENTOR
Ulysses C. Rigoulot.
BY Harness, Lind, Patee & Harris
ATTORNEYS.

Patented Aug. 31, 1943

2,328,366

UNITED STATES PATENT OFFICE 2,328,366

GLARE SHIELD MOUNTING

Ulysses C. Rigoulot, Detroit, Mich., assignor to Chrysler Corporation, Highland Park, Mich., a corporation of Delaware Application June 25, 1942, Serial No. 448,387

7 Claims. (Cl. 287—21)

This invention relates to an improved mounting for a glare shield or sun visor of the type used in the body of a motor vehicle to intercept blinding sun or other rays without appreciably interfering with road vision.

The invention has for its object the provision of an improved mounting for a shield or visor to accommodate swinging thereof about an axis between a position generally parallel to the vehicle body windshield and a position to the side of the body transverse to the vehicle and for vertical adjustment thereof about a horizontal axis.

Another object of the invention is the provision of an improved mounting adapted to accommodate positioning of the shield or visor as aforesaid and including an improved arrangement of friction-producing means for opposing adjustment of the shield about its axis. More particularly, the invention provides a pair of cooperating frictional surfaces adapted to oppose movement of the visor about each of its aforesaid axes together with means for thrusting these surfaces into frictional engagement, the thrusting means frictionally resisting yet accommodating movement of the shield about its axes.

A further object is to provide a mounting according to the foregoing wherein the friction producing and thrusting means are substantially concealed and scuffing or marring of visible external surfaces is avoided.

Other objects and advantages of the invention will be more apparent from the following description taken in connection with the accompanying drawing, in which:

Fig. 1 is a fragmentary view of the interior of a vehicle body having a glare shield mounted therein according to the invention.

Fig. 2 is an enlarged elevational view, partly in section, of the glare shield and supporting structure, shown in Fig. 1.

Fig. 3 is a transverse section taken on line 3—3 of Fig. 2.

Fig. 4 is a front elevational view of the mounting fixture shown in Figs. 1 and 2.

Fig. 5 is a side elevational view of the tensioning and seating member which is detachably securable to the mounting fixture and engageable with the glare shield supporting rod as shown in Fig. 2.

Fig. 6 is a side elevational view of the friction member movable with the glare shield supporting rod and engageable with the mounting fixture as shown in Fig. 2.

The vehicle body includes the usual windshield 10, a door 11 adjacent thereto, and header indicated at 12 above the windshield. A glare shield or sun visor, generally designated by the numeral 13, has an operative position with respect to the windshield 10 as shown in full lines in Fig. 1, to intercept sun or other rays and is vertically adjustable about a horizontal axis to assume the dotted line position above the windshield 10. The shield or visor mounting is also adapted to accommodate swinging thereof in an arcuate path of approximately 90° to the dotted line position at the door 11 for intercepting light rays directed toward the side of the vehicle.

The shield 13 includes a light intercepting part 14 of any desired material received between spaced arms 15 of a tubular sleeve member 16 and covered by a fabric material 17. A supporting rod 18 is slidable in the sleeve member 16 and has diametrically opposed radially outwardly extending flanges 19 and 20 respectively received in axially extending notches 21 and 22 formed in the member 16 to thereby prevent relative rotation between the shield proper and the rod 18. A portion of the flange 19 is removed as shown in Fig. 3 to accommodate reception of a bowed anti-rattle spring 23 in the notch 21, the spring 23 extending part way into an opening 24 formed in the upper wall portion of the notch 21. The visor and spring are thus slidable axially on the rod 18, within the limits of the cutaway portion of the flange 19 to adjust the light intercepting position of the visor transversely of the windshield 10.

The rod 18 may be formed from sheet metal flat stock and is provided with a hollow ball-shaped end 25 and an adjacent annular shoulder 26, together with a generally radially extending tongue 27.

Associated with and supporting the glare shield carrying rod 18 is a mounting fixture, generally identified by the numeral 28, including a plate-like part 29 having openings 30 therein receiving screws or the like for securing the fixture to the header 12 as shown in Fig. 1. Integral with the plate-like part 29 is a generally semi-spherical hollow part 31 having an opening 32 herein through which the rod 18 extends with the end 25, shoulder 26 and tongue 27 enclosed by the hollow part 31 when the mounting is attached to the supporting header 12. The opening 32 is elongated, as shown in Fig. 4, to accommodate swinging of the rod 18 and glare shield in an arcuate path between a light ray intercepting position with respect to the windshield 10 and a similar position with respect to the door 11. Intersecting the opening 32 is a second opening 33 to accommodate tilting of the shield downwardly as viewed in Fig. 1.

A friction member 34 is positioned within the hollow part 31 and adapted to be thrust into frictional engagement therewith to oppose movement of the rod 18 and shield relative to the fixture 28, these engaging surfaces having the same general radius of curvature and preferably defining a portion of a sphere. The member 34 has a central opening 35 therein provided with diametrically opposed elongations, as shown in Fig. 6, to accommodate insertion of the rod 18 therethrough, it being understood that the opposed elongations are provided to permit passage of the rod flange 19 and 20. The tongue 27 on the rod 18 is received in one of the aforesaid elongations of the opening 35 to cause the member 34 to move with the rod 18 when the latter is swung in its arcuate path as aforesaid and rotated about a horizontal axis to position the shield above the windshield.

A tensioning member 36 detachably secured to the fixture 28 has a seat 37 defining a portion of a sphere receiving the ball-shaped end 25 of the arm 18 and accommodating movement of the arm and shield to the various positions as set forth above. The member 36 has a plurality of spring fingers 38 defining a portion of a loop, each having a flanged end respectively received in openings 39 in the fixture 28, as shown in Fig. 2. In assembly, the spring fingers 37 are compressed inwardly and the flanged ends brought into registration with the receiving opening 39. When assembled the seating surface 37 of the member 36 frictionally engages the ball-shaped end 25 of the rod 18 to oppose movement of the latter and the shield as aforesaid and to thrust the rod generally axially to thereby cause the shoulder 27 to thrust the friction member 34 into engagement with the internal surface of the hollow part 31 of the fixture 28 and frictionally oppose the aforesaid movement of the rod 18.

Rotation of the rod 18 about its longitudinal axis to position the shield in its dotted line position above the windshield is frictionally opposed by engagement of the member 34 with the internal surface of the hollow part 31 of the fixture and engagement of the tensioning member seat 37 with the end 25 of the rod 18, which frictional opposition serves to retain the shield in its aforesaid dotted line position. A similar resistance is utilized to oppose swinging of the rod and shield in an arcuate path to the dotted line position of the latter with respect to the door 11. It will be understood that when the shield is in an operative position with respect to the door 11 or windshield 19 the rod 18 may rest upon the lower portion of the wall bounding the opening 32 for support thereby.

Although but one embodiment of the invention is herein shown and described, it will be understood that various changes in the size, shape and arrangement of parts may be made without departing from the spirit of my invention and it is not my intention to limit said invention other than by the terms of the appended claims.

I claim:

1. In a support for adjustably mounting a glare shield, a fixed member including a hollow portion having an internal bearing surface thereof defining a portion of a sphere and having an opening therein, a glare shield supporting rod having a portion thereof extending through said opening into said hollow portion and adapted for rotative movement about its longitudinal axis relative to said fixed member and for swinging movement relative to the latter between a plurality of set positions, said rod portion having a bearing surface defining a portion of a sphere, a bearing member in said hollow portion movable with said rod having a bearing surface defining a portion of a sphere engaging said internal bearing surface, and a member detachably secured to said fixed member having a bearing surface defining a portion of a sphere engaging said rod bearing surface, said engaging bearing surfaces frictionally opposing said movement of said rod.

2. In a support for adjustably mounting a glare shield, a fixed member including a hollow portion having an internal bearing surface thereof defining a portion of a sphere and having an opening therein, a glare shield supporting rod having a portion thereof extending through said opening into said hollow portion and adapted for rotative movement about its longitudinal axis relative to said fixed member and for swinging movement relative to the latter between a plurality of set positions, said rod portion having a bearing surface defining a portion of a sphere, a bearing member in said hollow portion movable with said rod having a bearing surface defining a portion of a sphere engaging said internal bearing surface, and a member detachably secured to said fixed member having a bearing surface defining a portion of a sphere engaging said rod bearing surface, said detachable member acting on said rod to thrust said engaging bearing surfaces into frictional engagement whereby to frictionally oppose said movement of said rod.

3. In a support for adjustably mounting a glare shield, a fixed member including a hollow portion provided with a bearing surface internally thereof and having an opening therein, a glare shield supporting member extending through said opening and adapted for movement relative to said fixed member whereby to dispose the shield in a plurality of relatively different positions, said supporting member having a seating portion at least partially enclosed by said fixed member, a bearing surface movable with said supporting member and engageable with said internal bearing surface to frictionally oppose movement of said supporting member, a member having a seat receiving said seating portion to accommodate movement of said supporting member as aforesaid and having a plurality of spring fingers respectively engaged in openings in said fixed member and operating to urge said seat against said seating portion and to thrust said bearing surfaces into frictional engagement.

4. In a support for adjustably mounting a glare shield, a fixture including a hollow portion having an opening and provided with a bearing surface internally thereof, a glare shield supporting member extending through said opening and adapted for rotation about its longitudinal axis and swinging movement in an arcuate path relative to said fixture whereby to dispose the shield in a plurality of relatively different positions, bearing surfaces movable with said supporting member, one thereof adapted to be thrust into frictional engagement with said internal bearing surface to oppose movement of said member as aforesaid, and a second bearing surface carried by said fixture frictionally engaging the other of said movable bearing surfaces for opposing said movement of said supporting member and thrusting said one movable bearing surface into frictional engagement with said internal bearing surface, each of said engaging bearing surfaces being so contoured as to allow movement of said supporting member as aforesaid.

5. In a support for adjustably mounting a glare shield, a fixture including a hollow portion having an opening and provided with a bearing surface internally thereof, a glare shield supporting member extending through said opening and adapted for rotation about its longitudinal axis and swinging movement in an arcuate path relative to said fixture whereby to dispose the shield in a plurality of relatively different positions, bearing surfaces movable with said supporting member, one thereof adapted to be thrust into frictional engagement with said internal bearing surface to oppose movement of said member as aforesaid, and a second bearing surface carried by said fixture frictionally engaging the other of said movable bearing surfaces for opposing said movement of said supporting member and thrusting said one movable bearing surface into frictional engagement with said internal bearing surface, each of said engaging bearing surfaces being so contoured as to allow movement of said supporting member as aforesaid, said second bearing surface being detachable from said fixture to accommodate relative separation of the latter and said supporting member.

6. A glare shield mounting including a glare shield supporting rod and a fixture having a hollow portion provided with an opening receiving an end portion of said rod and accommodating movement of the rod relative to the fixture for disposing the shield in a plurality of relatively different positions, a washer movable with the rod disposed in said hollow portion and engageable with the internal periphery thereof to frictionally oppose rod movement, and a member engaging said rod end portion having a plurality of spring fingers detachably engaged with said fixture, said fingers being conditioned when engaged with said fixture to urge said member against said rod end portion and to thereby thrust said washer into frictional engagement with said internal periphery as aforesaid.

7. A glare shield mounting including a glare shield supporting rod and a fixture having a hollow portion provided with an opening receiving an end portion of said rod and accommodating movement of the rod relative to the fixture for disposing the shield in a plurality of relatively different positions, a friction surface movable with said rod and engageable with the internal periphery of said hollow portion in response to thrust of said rod longitudinally of its axis to thereby frictionally oppose rod movement, and a member having a body part frictionally engaging the rod end portion and a plurality of spring fingers detachably engaged with said fixture, said fingers being conditioned when engaged with said fixture to urge said body part into frictional engagement with said rod end portion and to thrust said rod longitudinally of its axis as aforesaid.

ULYSSES C. RIGOULOT.